(12) United States Patent
Streibig

(10) Patent No.: US 8,608,311 B2
(45) Date of Patent: Dec. 17, 2013

(54) COLORED CONTACT LENS

(71) Applicant: Daniel G. Streibig, Ballwin, MO (US)

(72) Inventor: Daniel G. Streibig, Ballwin, MO (US)

( * ) Notice: Subject to any disclaimer, the term of this patent is extended or adjusted under 35 U.S.C. 154(b) by 0 days.

(21) Appl. No.: 13/710,000

(22) Filed: Dec. 10, 2012

(65) Prior Publication Data
US 2013/0100399 A1    Apr. 25, 2013

Related U.S. Application Data

(62) Division of application No. 12/834,724, filed on Jul. 12, 2010, now Pat. No. 8,328,352.

(60) Provisional application No. 61/224,868, filed on Jul. 11, 2009.

(51) Int. Cl.
*G02C 7/04*    (2006.01)

(52) U.S. Cl.
USPC ............... 351/159.31; 351/159.74; 351/159.8

(58) Field of Classification Search
USPC ............... 351/159.24–159.32, 159.74, 159.8, 351/159.81
See application file for complete search history.

(56) References Cited

U.S. PATENT DOCUMENTS

| | | |
|---|---|---|
| 6,655,804 B2 | 12/2003 | Streibig |
| 6,733,126 B2 | 5/2004 | Streibig |
| 6,767,097 B2 | 7/2004 | Streibig |
| 6,896,369 B2 | 5/2005 | Streibig |
| 7,296,891 B2 | 11/2007 | Streibig |
| 7,438,412 B2 | 10/2008 | Ocampo |
| 2002/0039172 A1* | 4/2002 | Ocampo et al. ............... 351/162 |
| 2006/0158610 A1 | 7/2006 | Streibig |
| 2006/0181676 A1* | 8/2006 | Tucker et al. ................ 351/162 |

OTHER PUBLICATIONS

Office Action dated Apr. 18, 2012, U.S. Appl. No. 12/834,724, 9 pgs.
Response to Office Action dated Apr. 18, 2012, U.S. Appl. No. 12/834,724, filed Jul. 23, 2012, 7 pgs.

* cited by examiner

*Primary Examiner* — Darryl J Collins
(74) *Attorney, Agent, or Firm* — Senniger Powers LLP

(57) ABSTRACT

A computer-implemented method of designing an iris region of a colored contact lens including providing an annular digital image representing at least a portion of an iris region of the eye. Applying a gradient fill algorithm to the digital image. And applying a halftoning algorithm to the digital image.

7 Claims, 20 Drawing Sheets
(13 of 20 Drawing Sheet(s) Filed in Color)

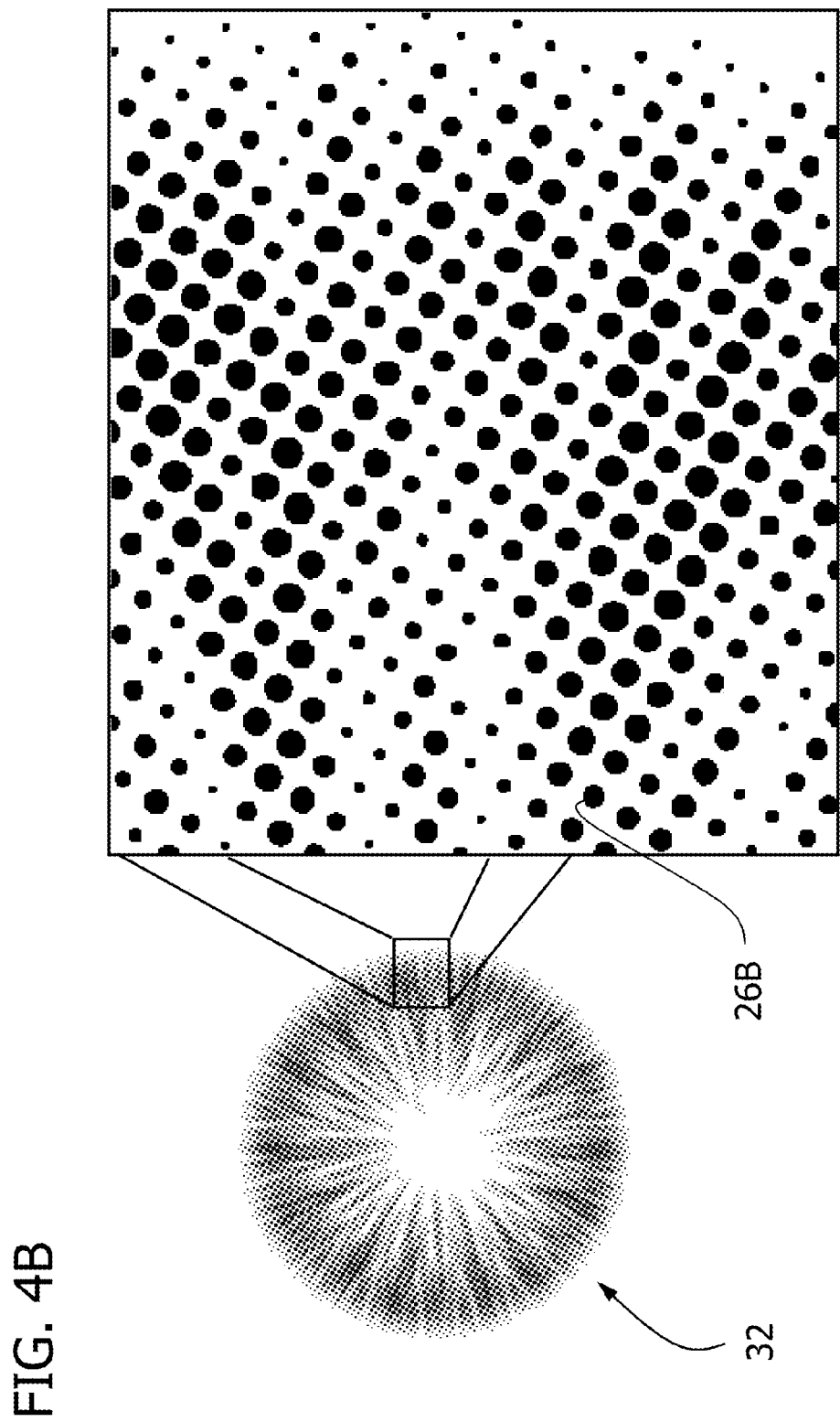

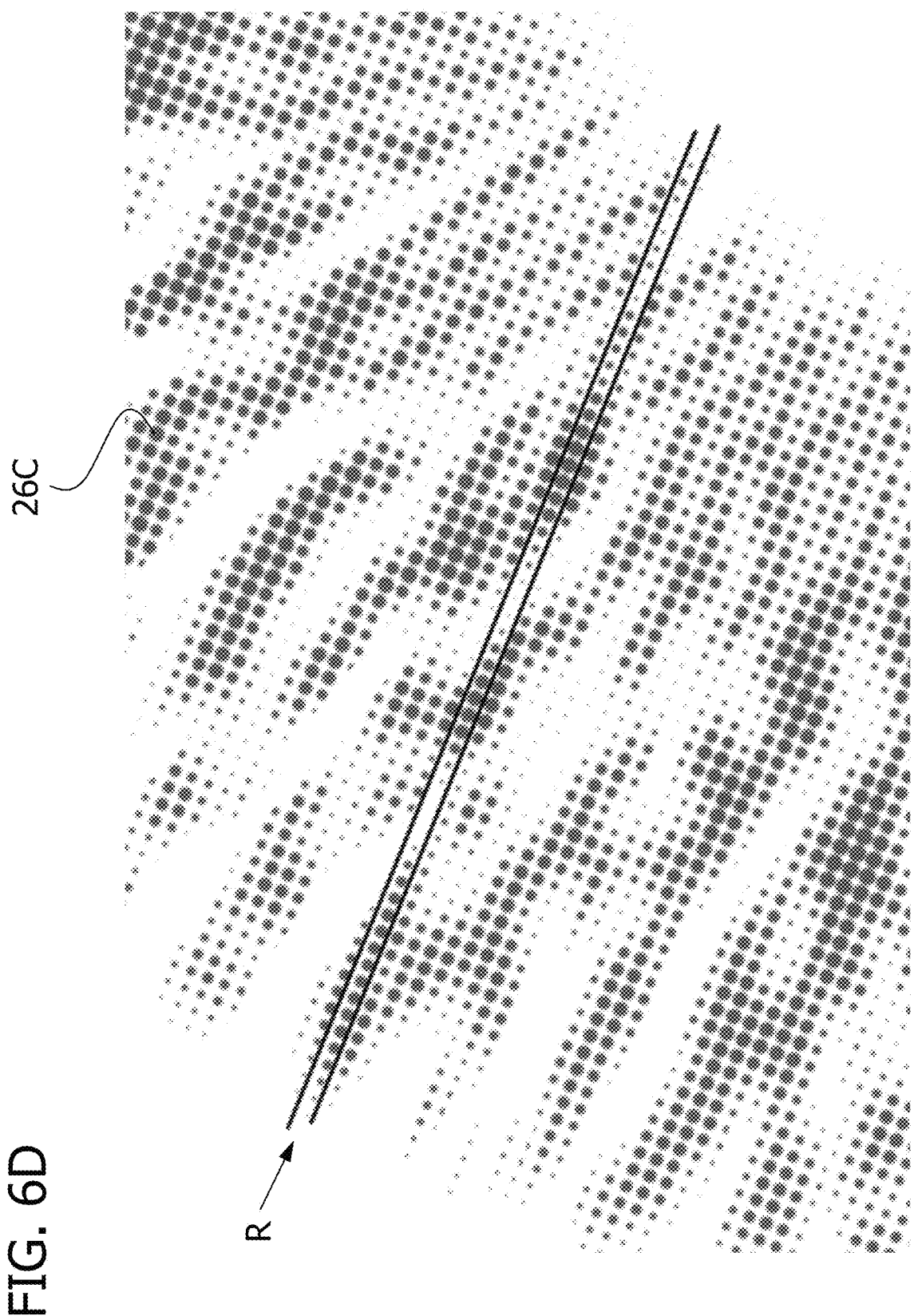

COLORED CONTACT LENS

CROSS-REFERENCE OF RELATED APPLICATIONS

This is a Divisional application of application Ser. No. 12/834,724, filed Jul. 12, 2010, which is a Non-Provisional application of Provisional Application No. 61/224,868, filed Jul. 11, 2009, the entireties of which are herby incorporated by reference.

FIELD OF THE INVENTION

The present invention generally relates to a colored contact lens, and more particularly to a colored contact having a more natural appearance.

BACKGROUND OF THE INVENTION

Since around 2002, cosmetic contact lens technology has advanced to where the ink patterns transferred to the lens can be "sandwiched" between layers of the lens material thus resolving comfort issues related to printing lens patterns on the anterior surface of the lens. A benefit from this advancement in the technology was that it enabled lens pattern elements from one color layer in the lens design to overlap lens pattern elements from another color layer. Lenses with overlapping patterns have tremendous potential to present a far superior cosmetic appeal in terms of vibrancy while appearing far more natural in appearance than the conventional cosmetic contact lenses commercially available today. Even the lenses commercially available today that do employ overlapping of pattern layers retain similar, if not all, of the defects of surface printed cosmetic lenses. These deficits include a limited color variance emitted from the lens pattern, abrupt and unnatural color transition between pattern layers, all of which contributes to a casual observer establishing a foreground-background relationship between the lens pattern on the lens and the wearers underlying iris which all combined, detract considerably away from the cosmetic appeal and natural appearance of the cosmetic contact lens.

SUMMARY OF THE INVENTION

In one aspect, a computer-implemented method of designing an iris region of a colored contact lens generally comprises providing an annular digital image representing at least a portion of an iris region of the eye. Applying a gradient fill algorithm to the digital image. And applying a halftoning algorithm to the digital image.

Other objects and features will be in part apparent and in part pointed out hereinafter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4B is a graphical representation of the second pattern of the colored iris region showing an enlarged portion thereof;

FIG. 6D is a graphical representation of a portion of the third pattern of the colored iris region outlining a row of color elements;

Corresponding reference characters indicate corresponding parts throughout the drawings.

DETAILED DESCRIPTION OF THE DRAWINGS

Figure 1A:
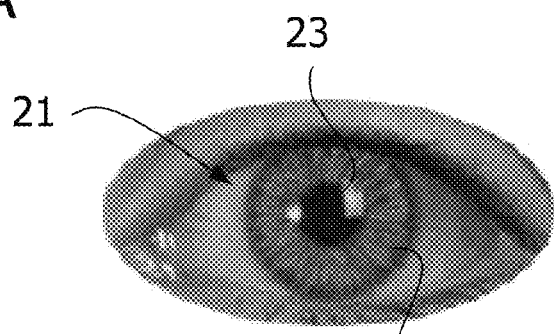
FIG. 1A is an illustration of an eye of a wearer.
Figure 1B:
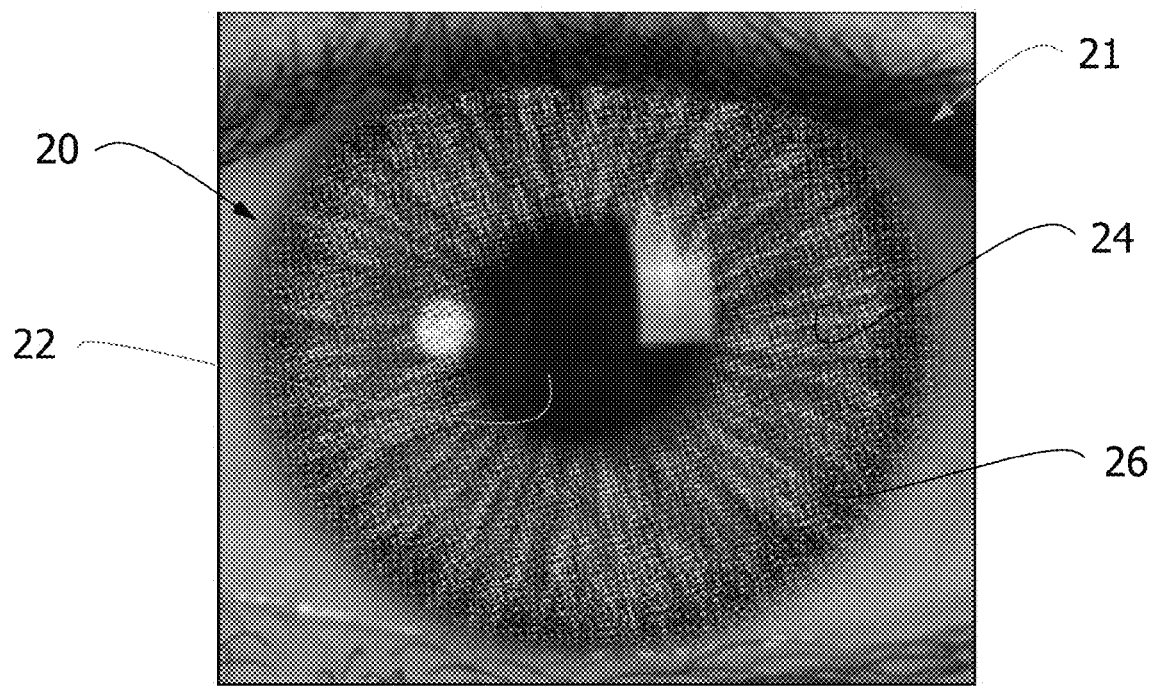
FIG. 1B is an enlargement of FIG. 1A showing a colored contact lens worn by the wearer, the contact lens having a colored iris region.
Figure 1C:
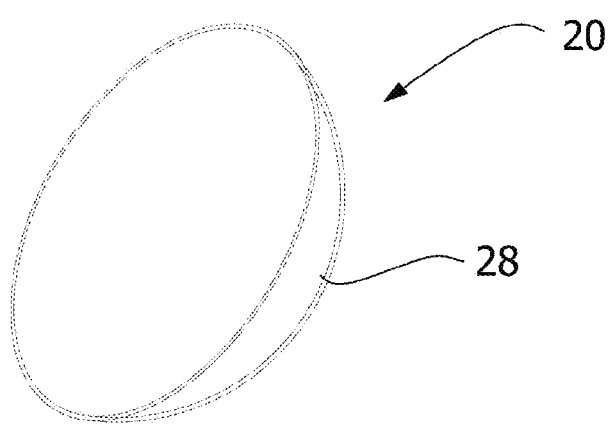
FIG. 1C is a perspective of the contact lens out of the eye.

Referring now to the drawings and in particular to FIGS. 1A-1C, a colored contact lens, such as a hydrophilic contact lens, is indicated in its entirety by the reference numeral 20. In FIG. 1 the contact lens 20 is placed over a wearer's eye 21. The contact lens 20 comprises a generally uncolored pupil region 22 and a generally colored, annular-shaped iris region 24 surrounding the pupil region. The pupil region 22 must be sufficiently devoid of colorant to enable light to enter a pupil 23 of the wearer's eye 21 so the wearer can see through the contact lens 20. The iris region 24 covers at least 40% of the wearer's iris 25 when the wearer is wearing the lens 20. As used herein, the phrase "generally uncolored" when referring to a region of the contact lens 20 means the region is either clear, transparent, or only slightly colored and translucent and non-opaque. As used herein, the phrase "generally colored" when referring to a region of the contact lens 20 means the region includes discrete color elements interspersed with transparent or translucent spaces.

Color elements 26 define the iris region 24 of the lens 20. The color elements 26 may have dissimilar or generally similar or identical shapes within a pattern layer (e.g., dots) and vary in size, (i.e., surface area). For example, in the illustrated embodiment, the surface area of each of the smallest color elements 26 covers a surface area of approximately 15% as that of the largest color element, with intermediate size color elements ranging in any size between that of the smallest color elements in the pattern layer and that of the largest color elements in the pattern layer. In one example, the surface areas of the color elements 26 may be within a range of about 500 square microns to about 20,000 square microns, and preferably within a range of about 500 square microns to about 6,000 square microns. As explained in more detail below, in one embodiment the color elements 26 may be ink printed on the contact lens 20.

Figure 6A:
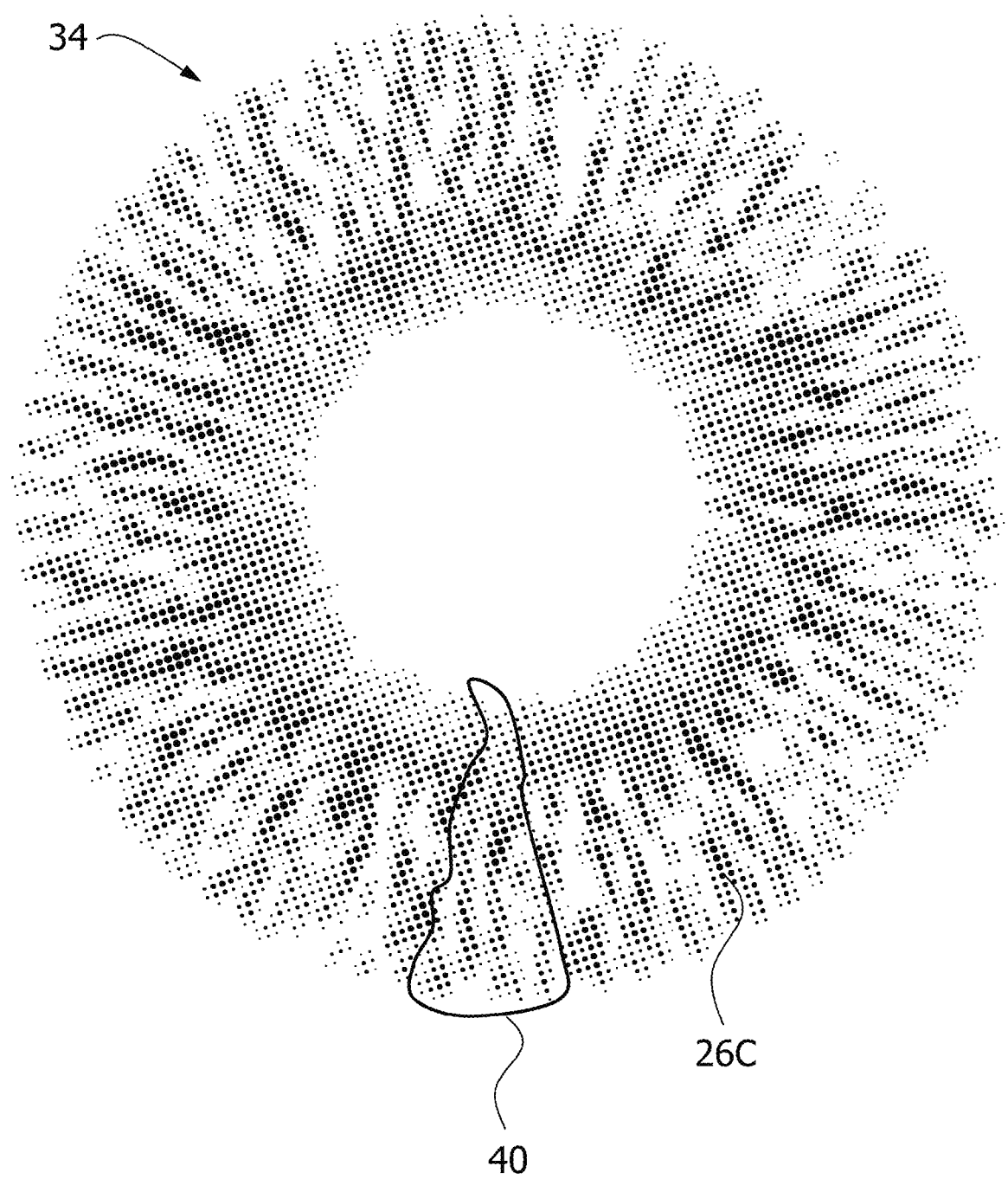
FIG. 6A is a graphical representation of a third pattern of the colored iris region.
Figure 6B:
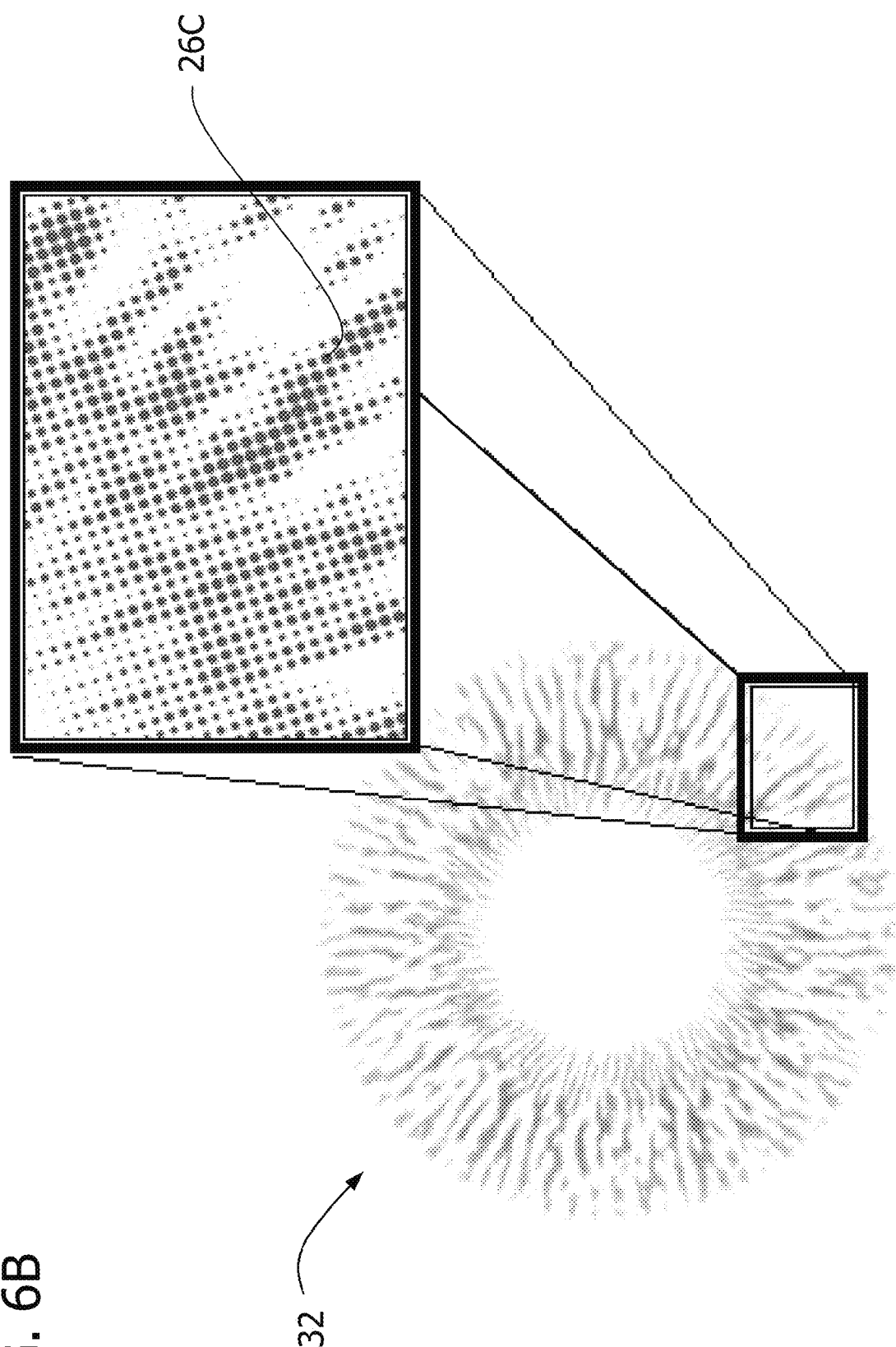
FIG. 6B is a graphical representation of the second pattern of the colored iris region showing an enlarged portion thereof.

In the illustrated embodiment, separate patterns comprised of color elements 26 are serially transferred to the contact lens substrate 28 in a manner that the color elements of one pattern layer will, in a pseudo random like manner, partially overlap at least some of the color elements of the constituent pattern layer elements, so that color elements of subsequent patterns may overlie color elements of previously formed patterns. For example, and explained in more detail below, the illustrated embodiment includes first, second and third patterns of color elements, generally indicated at 30, 32, and 34, respectively, that are serially transferred (e.g., printed) on the contact lens substrate 28. It is understood that the patterns (or their composite image) may be transferred to the lens substrate 28 using an ink jet device without departing from the scope of the present invention. It is also understood that a single pattern may be formed (e.g., printed) on the lens without departing from the scope of the present invention. Each pattern 30, 32, 34 (FIGS. 2, 4A and 6A, respectively) comprises a plurality of the color elements 26 varying in surface area. Moreover, it is envisioned that each pattern may comprise between about 1,000 and about 20,000 color elements 26, preferably between about 5,000 and about 10,000 color elements, and in one example, about 7,100 color elements.

Figure 2:
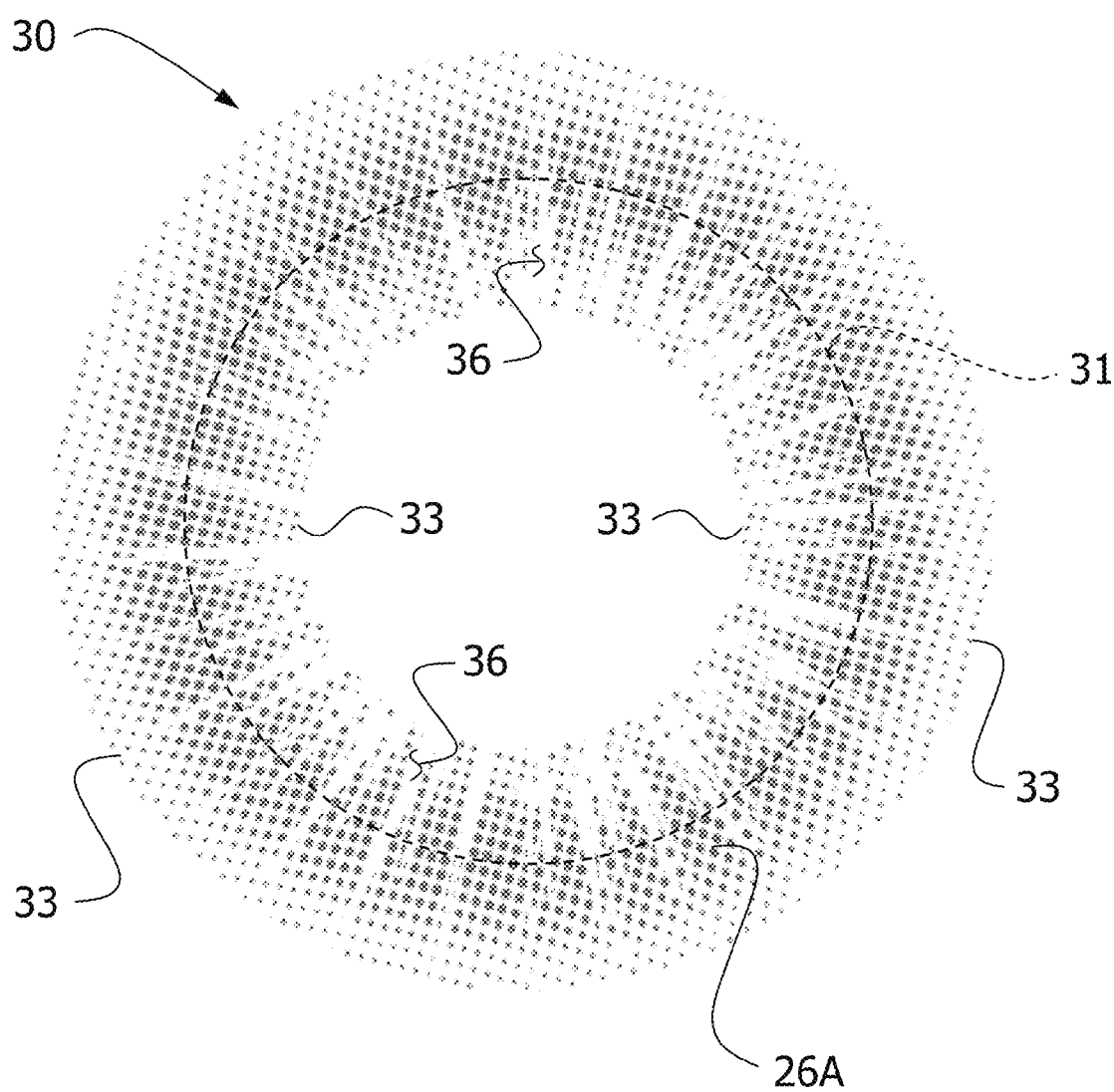
FIG. 2 is a graphical representation of a first pattern of the colored iris region.
Figure 3A:
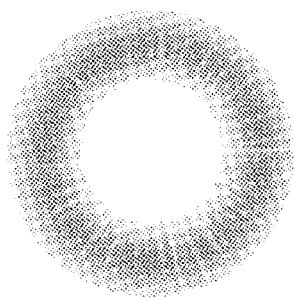
FIGS. 3A-3D are graphical representations of alternative designs of the first pattern.
Figure 3B:
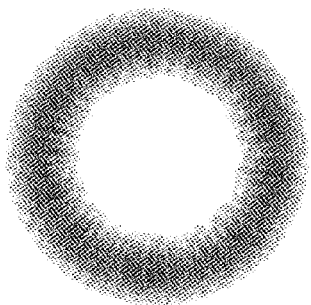
Figure 3C:
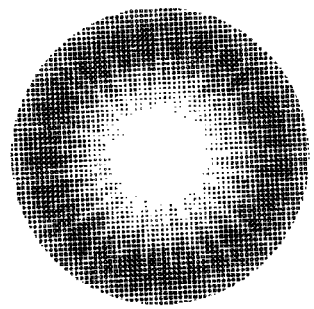
Figure 3D:
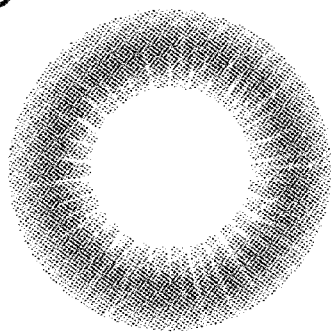

Referring to FIG. 2, the first pattern 30 of the iris region 24 of the illustrated lens 20 includes a multiplicity of first color elements 26A. The first color elements are grey in FIG. 2 for illustrative purposes. The first pattern 30 is in the form of an annulus having a mid-range 31 (schematically illustrated by dashed lines that do not form any part of the pattern) and a pair of outer and inner edge margins 33. This first pattern 30 may be referred to as a base pattern because it is the initial pattern printed on the lens 20 over which other subsequent patterns (e.g., the second and third patterns) are printed or otherwise formed. It is envisioned that the base pattern 30 establishes the overall predominant color of the iris region 24. However any pattern layer can be used to establish the predominant overall pattern color or shade.

The size of the color elements 26A and the spacing between perimeter edges of adjacent color elements vary depending on the radial location of the color elements relative to a center of the lens 20. The size of the color elements 26A and the spacing between perimeter edges of adjacent color elements within a particular region of the pattern 30 correlates to color concentration of the particular region. Accordingly, the illustrated base pattern 30 has a radial color concentration gradient. The color elements 26A gradually decrease in size and increase in distance between constituent color elements as they progress radially from the mid-range 31 of the annulus (i.e., toward the outer and inner edge margins 33 of the base pattern 30). Moreover, spacing between adjacent color elements 26A gradually increase in locations radially outward from the mid-range 31 (i.e., toward the outer edge margin of the base layer 30) and radially inward of the mid-range 31 (i.e., toward the inner edge margin 33 of the base pattern 30).

Thus, the mid-range 31 of the base pattern 30 has the greatest color concentration, and the color concentration of the base pattern decreases gradually from the mid-range toward the outer edge margin 33 of the base pattern and from the mid-range toward the inner edge margin 33 of the base pattern. Through this arrangement of the color elements 26A, the color elements in the base layer 30 blend with the underlying iris 25 of the wearer, particularly at a limbal margin (generally the location of the inner edge margin 33 of the lens 20 when the lens is worn by the wearer) and a pupillary margin (generally the location of the outer edge margin 33 of the lens 20 when the lens is worn by the wearer) of the wearer's eye 21.

In addition to having a radial color concentration gradient, the base pattern 30 has a "star formation" extending radially outward from the inner edge margin 33 of the base pattern. As used herein, a "star formation" is a plurality of slit-shaped uncolored regions 36 extending radially through a colored pattern. The slit-shaped uncolored regions 36 may have uniform or generally non-uniform radial lengths and tapering widths. As shown, the uncolored regions 36 emanate from the inner edge margin 33 toward the outer edge margin 33. The star formation in the illustrated base pattern 30 creates a larger area for the color of the underlying iris 25 to interact with the color of the color elements 26A of the base pattern. Further, the star formation "breaks up" the base pattern 30 at the pupillary region to give a more natural transition from the iris 25 to the pupil 22. It is understood that the illustrated base pattern 30 is merely an exemplary design and that other designs are possible and within the scope of the invention. Other exemplary base patterns are illustrated in FIG. 3.

Figure 4A:
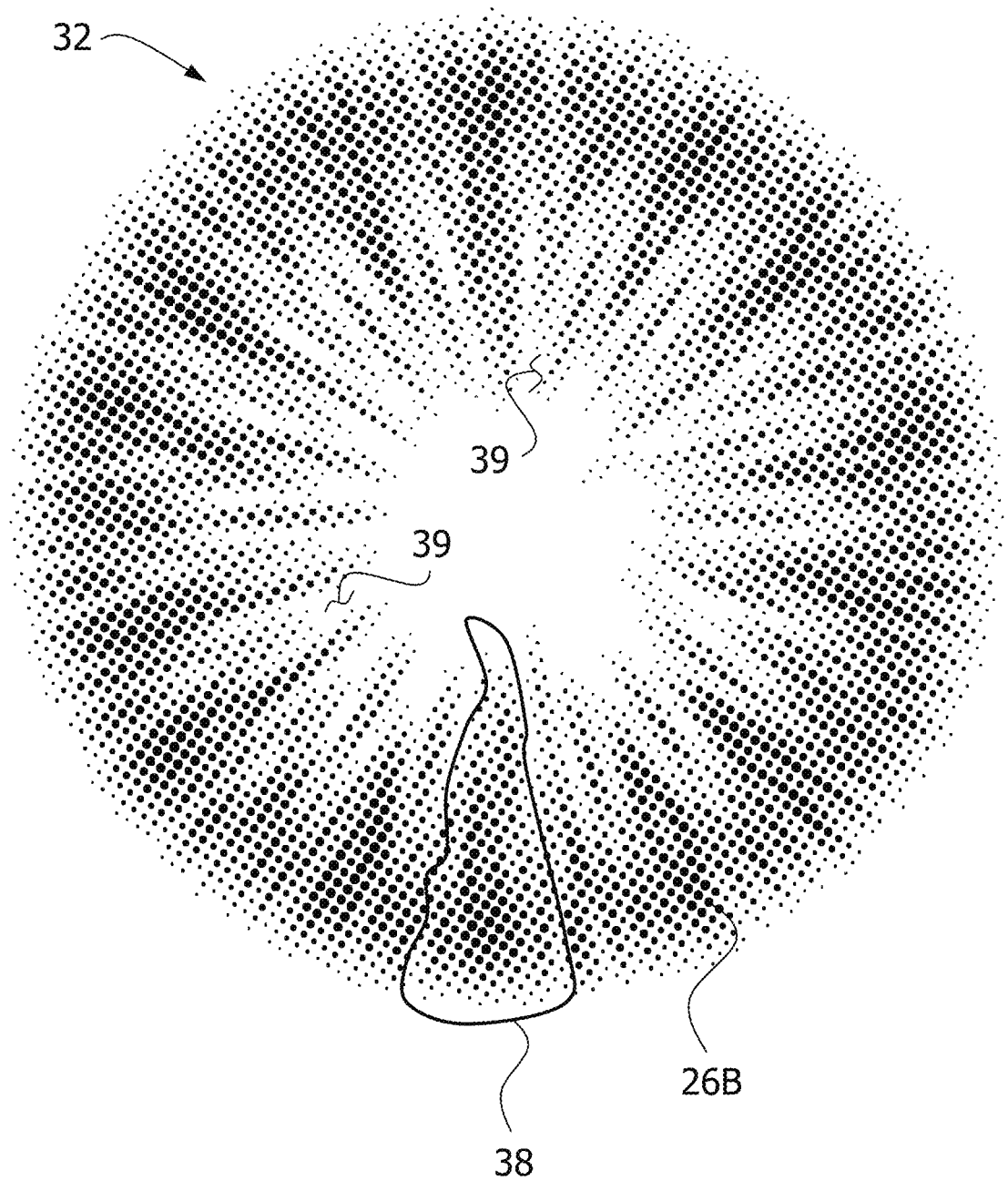
FIG. 4A is a graphical representation of a second pattern of the colored iris region.
Figure 5A:
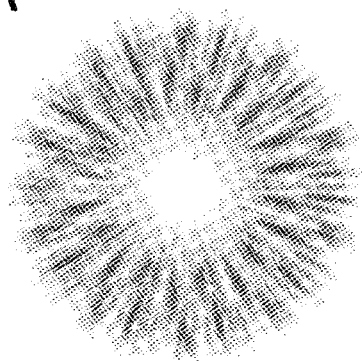
FIGS. 5A-5D are graphical representations of alternative designs of the second and third patterns.
Figure 5B:
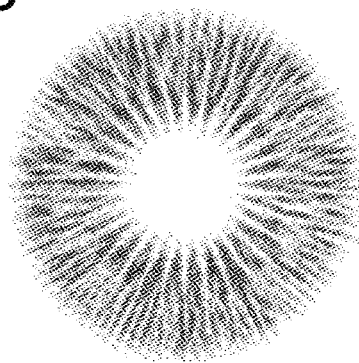
Figure 5C:
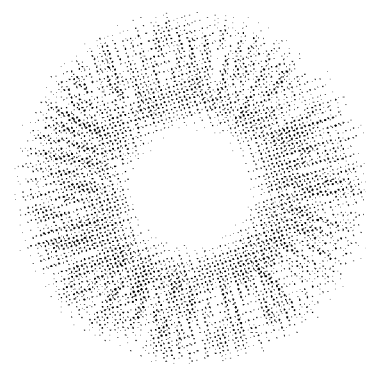
Figure 5D:
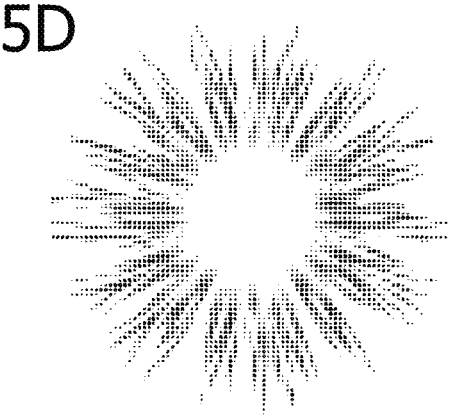

Referring to FIGS. 4A and 4B, the second pattern 32 of the iris region 24 of the illustrated lens 20 includes a plurality of second color elements 26B. The second color elements are black in FIGS. 4A and 4B for illustrative purposes. The second color elements 26B may be the same color or may be different colors. For example, the second color elements 26B are preferably of a different color than the first color elements 26A. Moreover, the second pattern layer 32 is preferably of a different design than the base pattern layer 30, although the design may be similar to or the same as the base pattern layer. Other designs are within the scope of the present invention. Other exemplary second (and/or third) patterns are illustrated in FIG. 5.

Broadly, the surface areas of the second color elements 26B and the spacing between perimeters of adjacent color elements generally vary along each of a plurality of radial regions from the center of the lens 20 and around each of a plurality of concentric annulus regions surrounding the center of the lens. More specifically, the second pattern 32 comprises clusters 38 of second pattern color elements 26B. An exemplary cluster 38 of color elements 26B is outlined in FIG. 4A. Each cluster 38 includes color elements 26B of varying surface areas and spacing. The cluster 38 may have an irregular shaped perimeter edge defined by a plurality of smaller sized color elements 26B. Looking at the cluster 38 outlined in FIG. 4A, the surface area of each color element 26B in the cluster and the spacing between adjacent color elements generally correlates to the distance of the color element from the perimeter edge of the cluster. More particularly, a color element 26B at the perimeter edge of the cluster 38 is smaller than a color element more adjacent to a central area of the cluster. Thus, the larger color elements 26B are closest together and located at or along a central region of the cluster 38, and the size of the color elements decreases and the spacing between the color elements increases toward the perimeter edge of the cluster. In other words, a central region of the cluster 38 includes relatively larger and relatively closer spaced color elements 26B and the size of the elements decreases and the spacing between adjacent elements increases in every direction (i.e., 360 degrees) from the central region of the cluster toward the perimeter edge margin of the cluster (see also, FIG. 4B). Moreover, the range of sizes of the second color elements 26B and the range of spacing between adjacent second color elements may be different than the sizes of the first color elements 26A and the range of spacing between adjacent first color elements. Accordingly, the color concentration of the cluster 38 decreases toward the perimeter edge of the cluster.

Depending on a particular design, some clusters 38 may be spaced apart from one another or, preferably, it may be difficult to discern where one cluster ends and another cluster begins because perimeter edges of adjacent clusters are coincident. Preferably, there are a plurality of clusters 38 along a radial direction relative to the center of the lens 20 and a plurality of clusters around an annular direction relative to the center of the lens. Through this arrangement, the second pattern 32 has a changing color concentration both annularly around the center of the lens 20 and radially outward from the center of the lens. This change in color concentration allows for better blending with the base pattern layer 30. As illustrated, the second pattern also includes a star formation made up of uncolored regions similar to the regions 36 of the first pattern 30.

Referring to FIGS. 6A-6D, the third pattern 34 of the iris region 24 of the illustrated lens 20 includes a plurality of third color elements 26C. The third color element are black in FIG. 6A and green in FIGS. 6B-6D for illustrative purposes. The third color elements 26C may be the same color or may be different colors. For example, the third color elements 26C are preferably of a different color than the first and second color elements 26A, 26B, although they may be the same color as either or both of the first and second color elements. Moreover, the third pattern 34 is preferably of a different design than the first and second patterns 30, 32, although the design may generally be similar or the same as either or both of the first and second patterns. Other designs are within the scope of the present invention. Other exemplary third (and/or second) patterns are illustrated in FIG. 5.

Figure 6C:
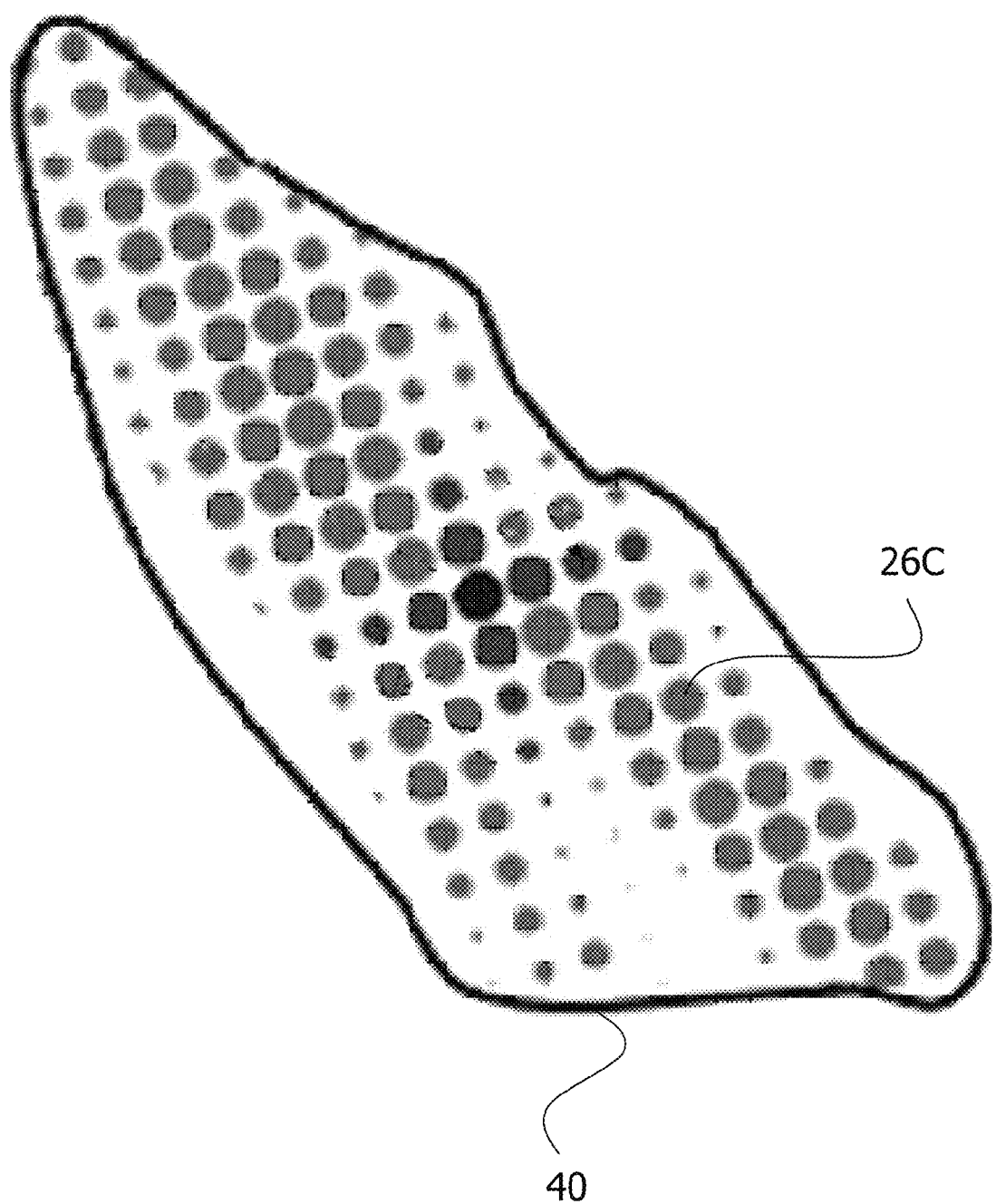
FIG. 6C is an enlarged view of a cluster of color elements of the third pattern of the colored iris region.
Figure 7:
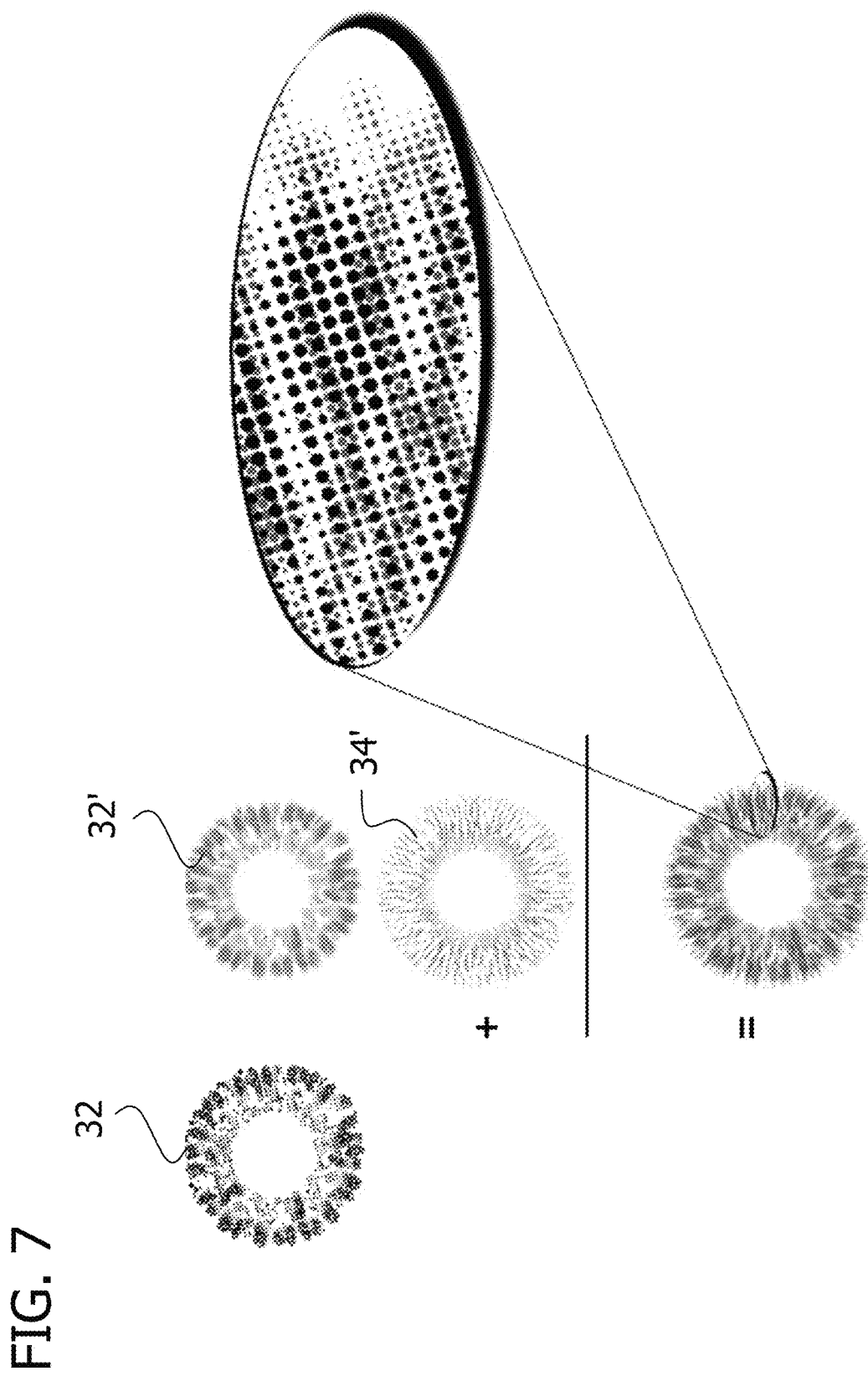
FIG. 7 is an illustration of a sequence of overlaying the second and third patterns of the lens.
Figure 8:
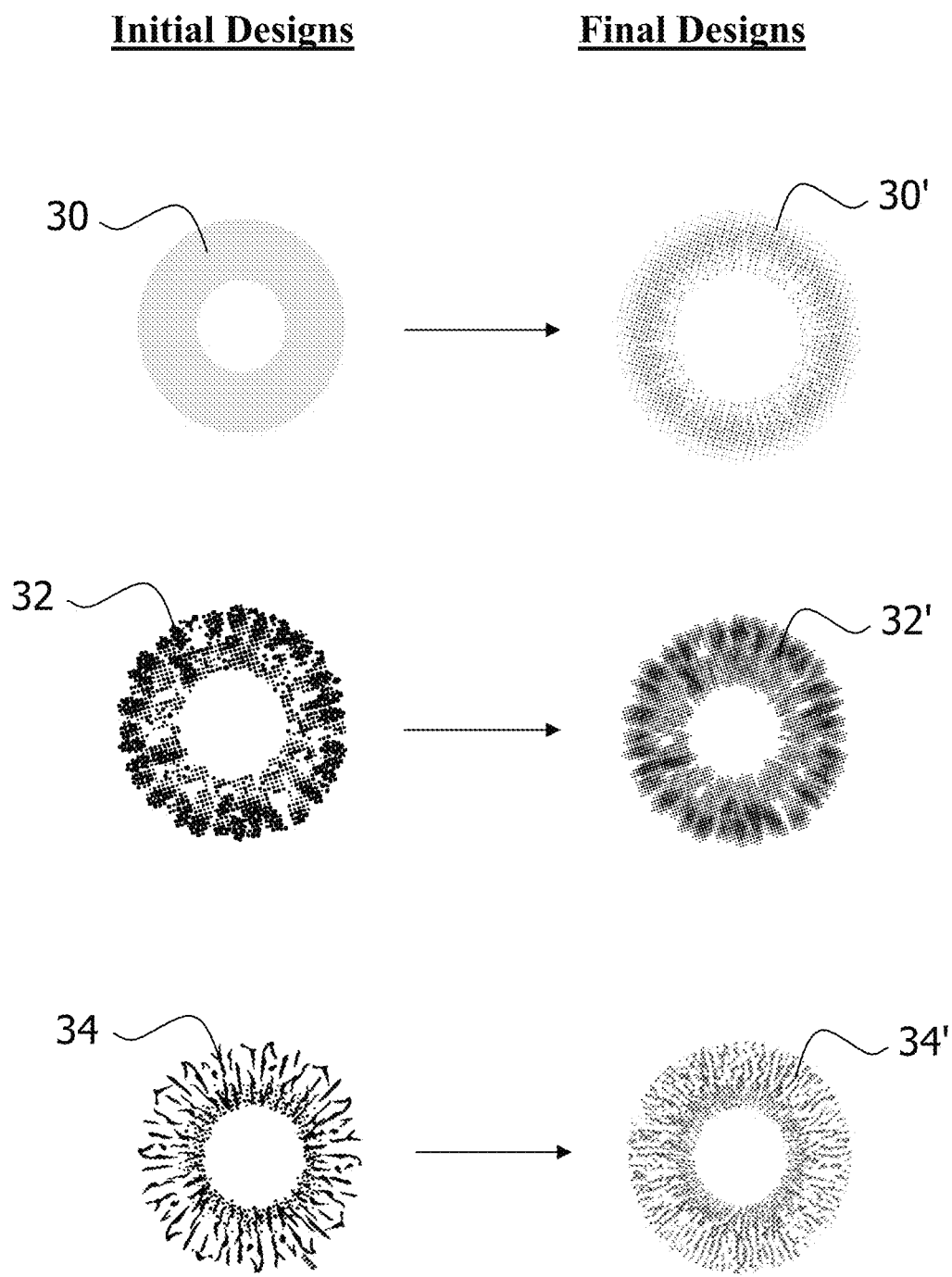
FIG. 8 is a graphical representation of initial designs of the first, second and third patterns and resulting final designs of the patterns produced by processes of the present invention.
Figure 9:
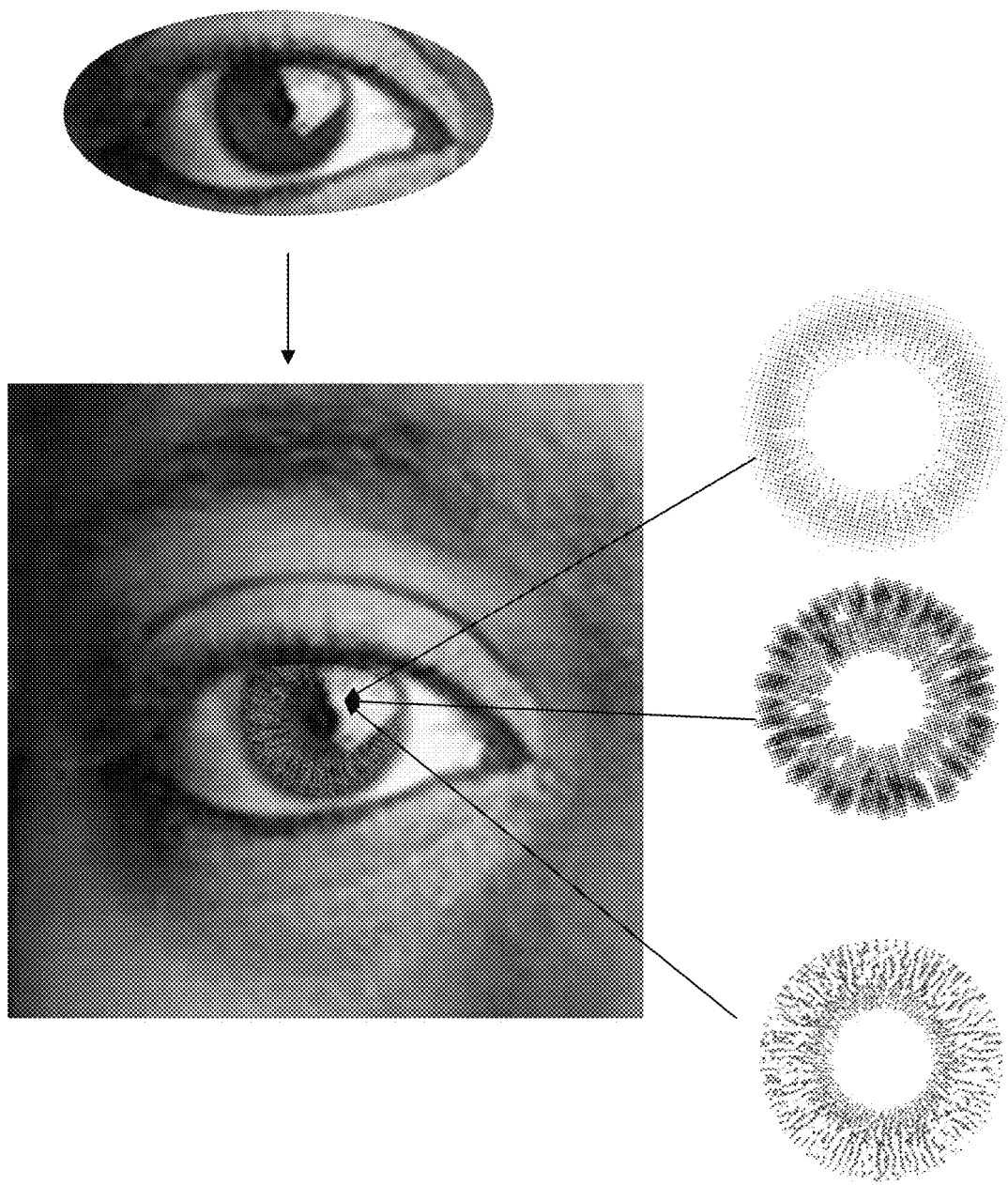
FIG. 9 is an illustration of the first, second and third patterns overlaid on the lens and worn by the wearer.
Figure 10:
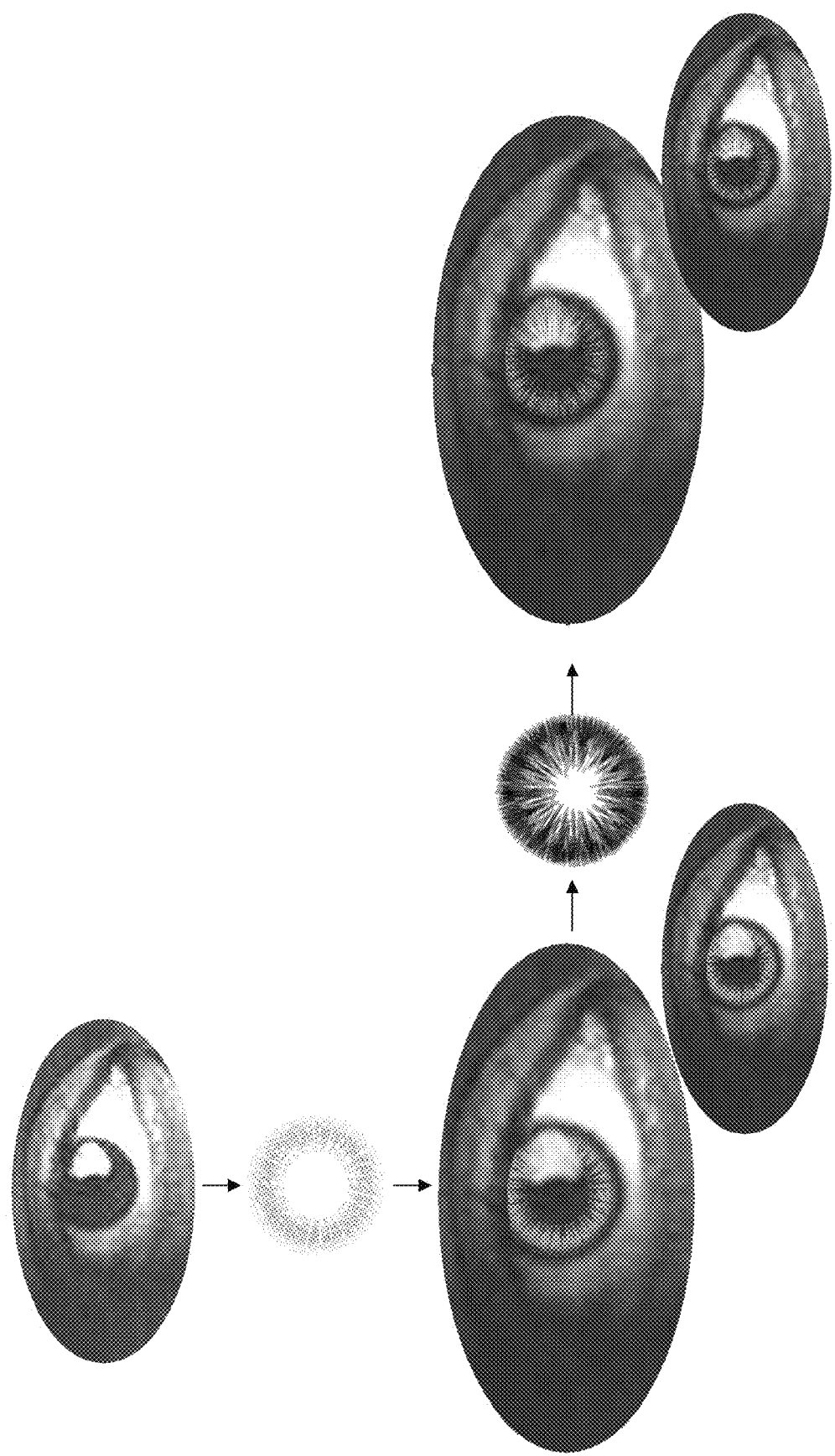
FIG. 10 is an illustration of a lens worn by a wearer having an overlay of the first and second patterns.

In general, the third pattern 34 is similar to the second pattern 32 in that broadly, the size of the third color elements 26C and the spacing between perimeters of adjacent color elements generally vary along each of a plurality of radial regions from the center of the lens 20 and around each of a plurality of concentric annulus regions surrounding the center of the lens. More specifically, the third pattern 34 comprises clusters 40 of third color elements 26C. An enlarged exemplary cluster 40 of color elements 26C is depicted in FIG. 6C. Each cluster 40 includes color elements 26C of varying sizes and spacing. The cluster 40 may have an irregularly shaped perimeter edge defined by a plurality of smaller sized color elements. Looking at the cluster 40 depicted in FIG. 6C, the size of each color element 26C in the cluster and the spacing between adjacent color elements generally depends on the distance of the color element from the perimeter edge of the cluster. More particularly, a color element 26C at the perimeter edge of the cluster 40 is smaller than a color element more adjacent to a central area of the cluster. Thus, the larger color elements 26C are closest together and located at a central region of the cluster 40, and the size of the color elements decreases and the spacing between the color elements increases toward the perimeter edge of the cluster. In other words, a central region of the cluster 40 includes relatively larger and relatively closer spaced color elements 26C and the size of the elements decreases and the spacing between adjacent elements increases as you move radially outward from the central region toward a perimeter edge of the cluster. Accordingly, the color concentration of the cluster 40 diminishes toward the perimeter edge of the cluster. Moreover, the range of sizes of the third color elements 26C and the range of spacing between adjacent third color elements may be different than the sizes of the first color elements 26A and/or the second color elements 26B and the range of spacing between adjacent first color elements and/or second color elements.

Preferably individual color elements 26B from the second layer 32 partially overlap at least 20% of the elements 26A from the base layer 30, and elements 26C from the third layer 34 overlap at least 20% of the elements 26A, 26B from the first and second layers 30, 32. The second color elements 26B may partially overlap about 35% of the first color elements 26A, and the third color elements 26C may partially overlap about 35% of first and second color elements 26A, 26B. Still further, the second color elements 26B may partially overlap about 50% of the first color elements 26A, and the third color elements 26C may partially overlap about 50% of first and second color elements 26A, 26B.

As can be seen in FIGS. 7-10, the color elements of one pattern blend with the color elements in the other pattern(s) so that there are smooth tonal transitions between the colors of the separate patterns. It is believed that the smooth transition is due at least in part to the gradual and continual decreasing and increasing in size (e.g., surface area) of the color elements through the iris region 24.

Figure 11:
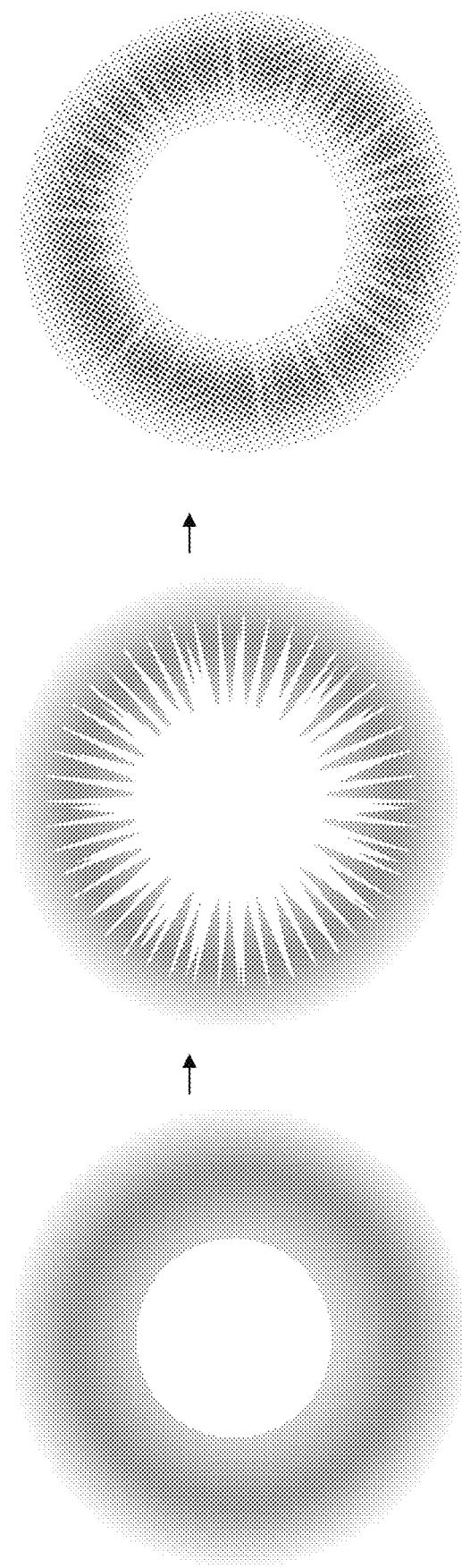
FIG. 11 is a graphical representation of a sequence creating a layer of the iris region of the contact lens.

FIG. 11 shows a sequence of creating an iris region or a layer useful in forming an iris region on a contact lens. The leftmost illustration shows a solid color annulus that has been subjected to a gradient fill, leaving a darker colored area near the midpoint radius of the annulus that tapers to the inner and outer edge margins of the annulus. In the center illustration, radial star cuts are created as a shape that is overlaid onto the gradient fill image. The rightmost illustration shows the center image after it is subjected to halftoning. Generally speaking, it is desirable to feather every concentrated region of color so that there is no sharp distinction between regions.

Figure 12:
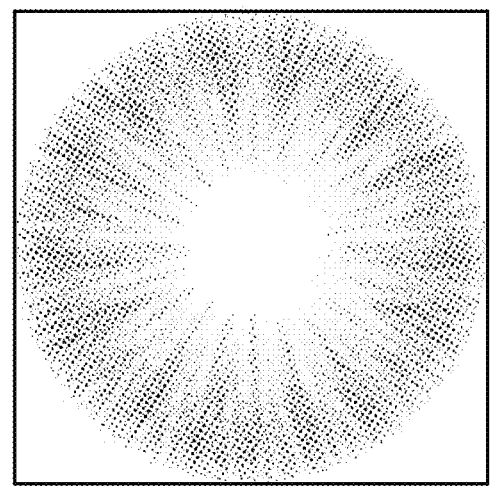
FIG. 12 is a graphical representation of a second colored iris region of the present invention as worn in the eye and by itself.
Figure 12:
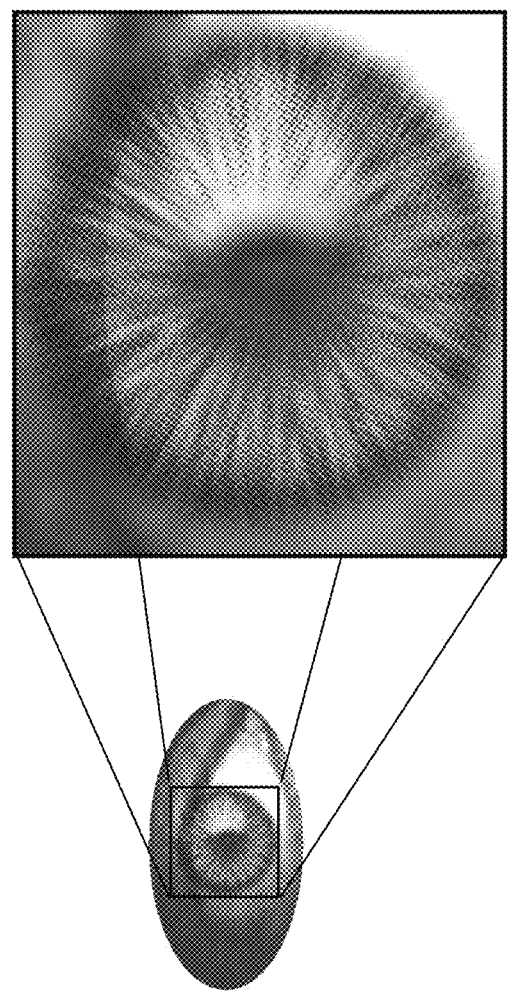

FIG. 12 shows another example of an iris region or layer useful to form an iris region for a contact lens using essentially the same techniques. FIG. 12 also shows, schematically, a contact lens with the iris region on an eye.

Figure 13:
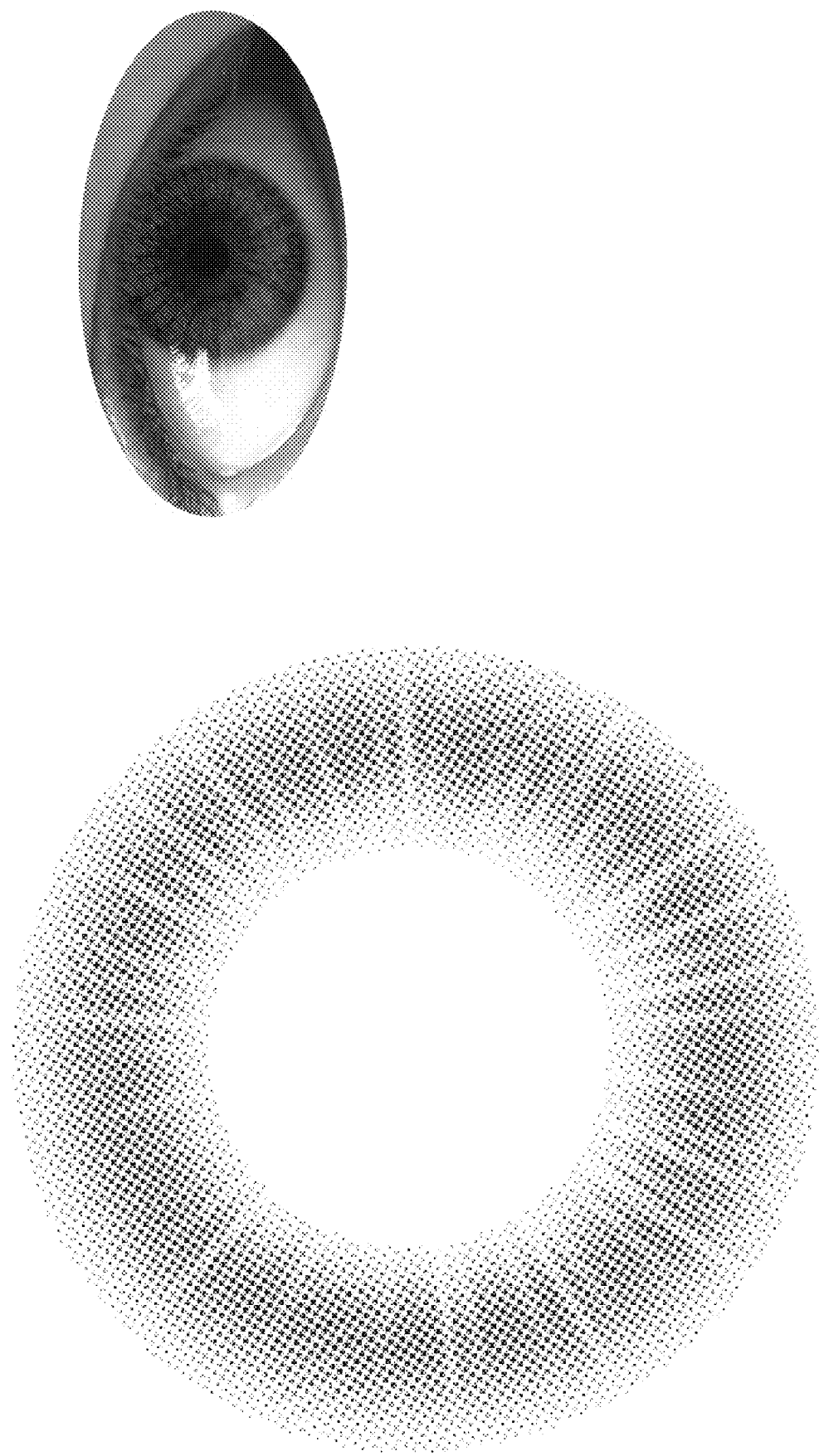
FIG. 13 is a graphical representation of a third colored iris region of the present invention by itself and as worn in the eye.

FIG. 13 shows another example of an iris region or layer useful to form an iris region for a contact lens using essentially the same techniques. FIG. 13 also shows, schematically, a contact lens with the iris region on an eye.

Figure 14:
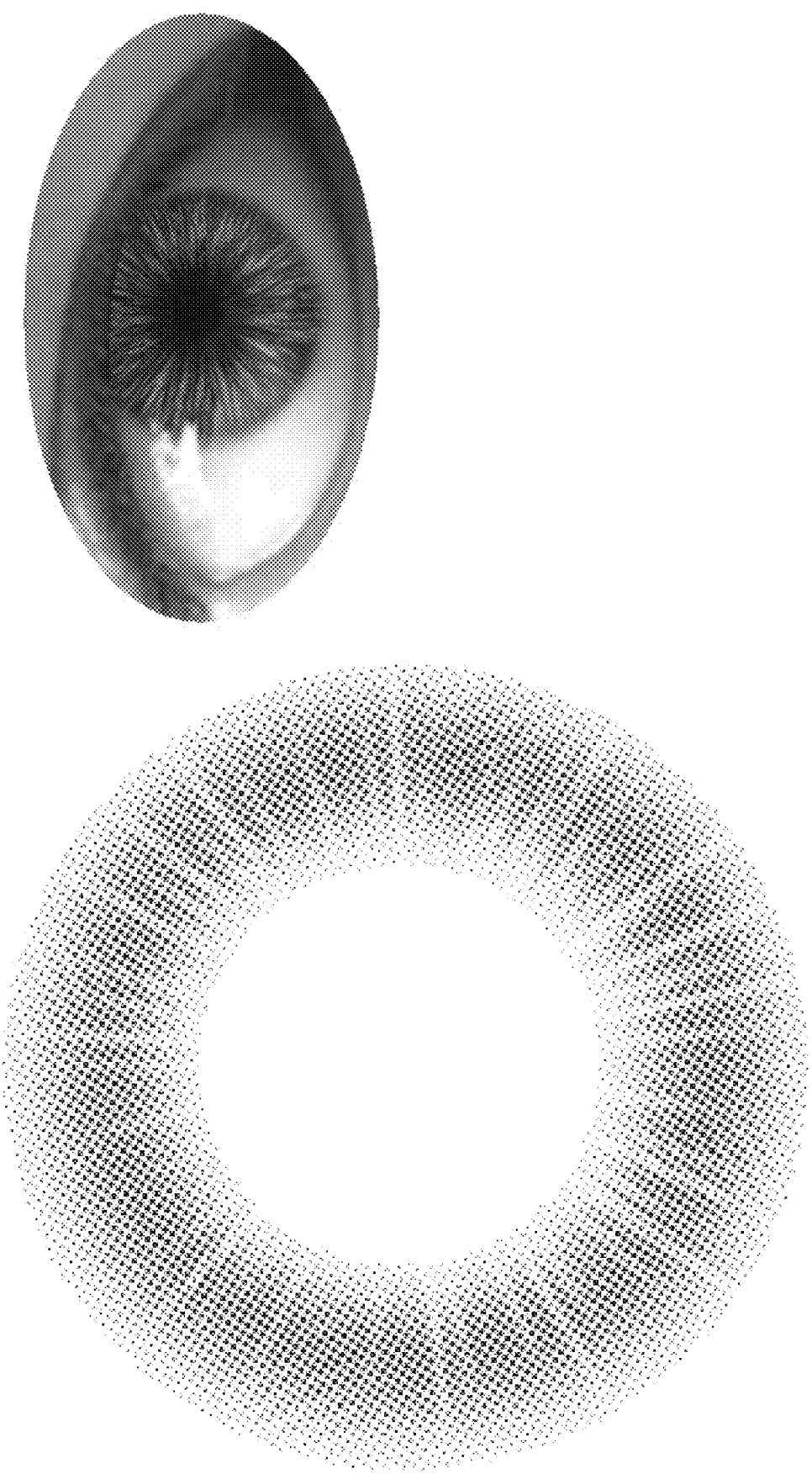
FIG. 14 is a graphical representation of a fourth colored iris region of the present invention by itself and as worn in the eye.

FIG. 14 shows another example of an iris region or layer useful in forming an iris region for a contact lens using essentially the same techniques. However, the iris region of FIG. 4 uses a radial blur function in addition to the gradient fill and the halftoning. FIG. 14 also shows, schematically, the lens applied to an eye. This design mimics the natural radial banding of the pupillary iris tissue in the human eye.

Figure 15:
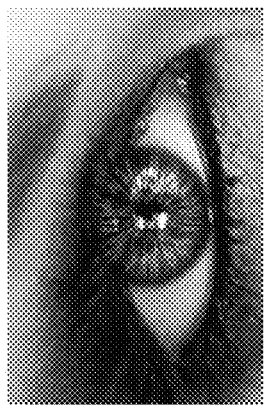
FIG. 15 is a graphical representation of a fifth colored iris region of the present invention by itself and as worn in the eye.
Figure 15:
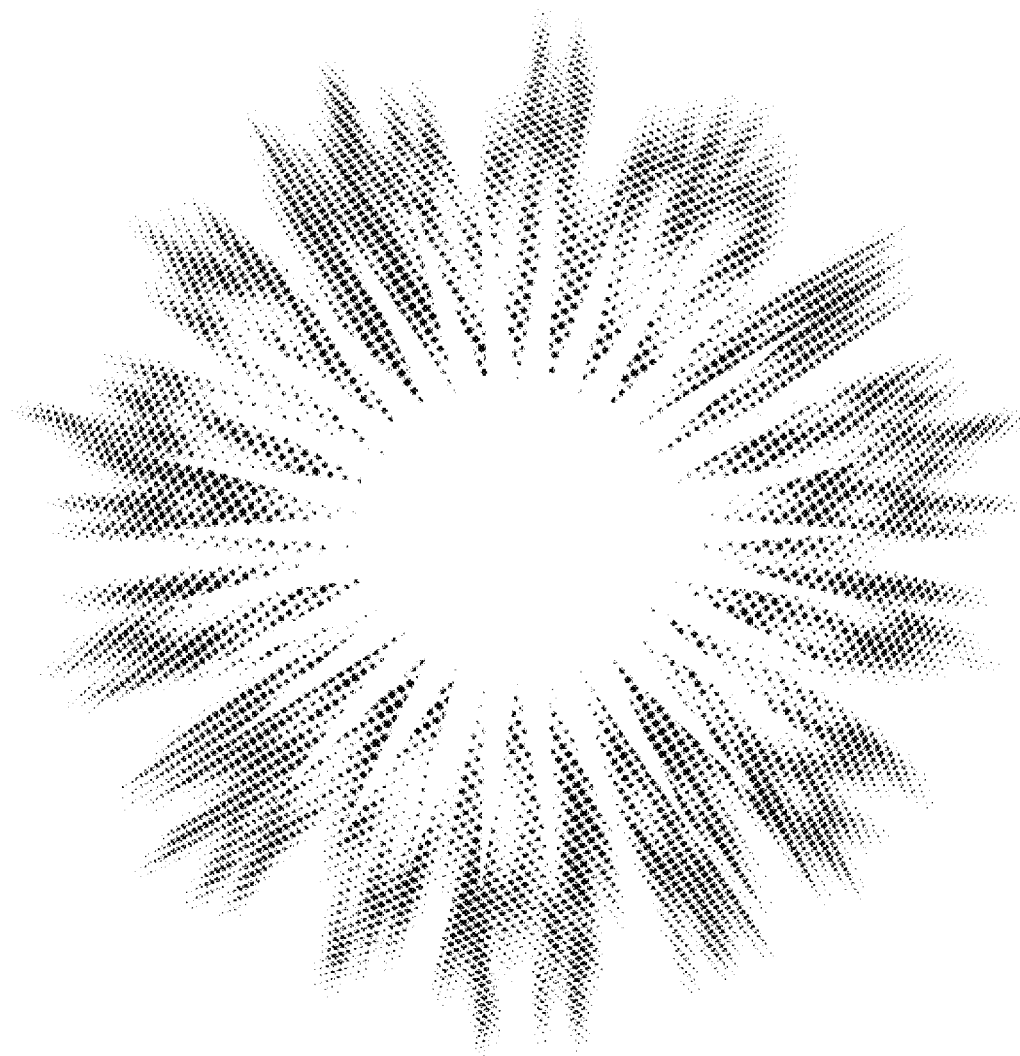

FIG. 15 shows another example of an iris region or layer useful in forming an iris region for a contact lens using essentially the same techniques. However, the iris region of FIG. 15 uses a radial blur function in addition to the gradient fill and the halftoning. FIG. 15 also shows, schematically, the lens applied to an eye.

Figure 16:
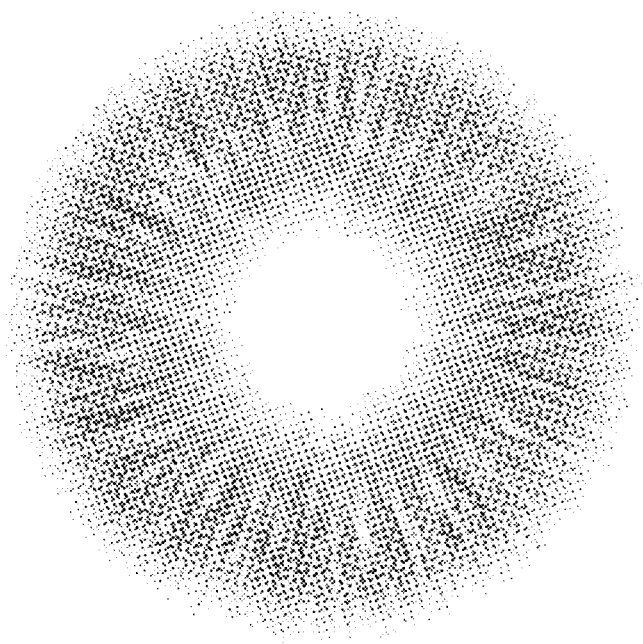
FIG. 16 is a graphical representation of a sixth colored iris region of the present invention.
Figure 17:
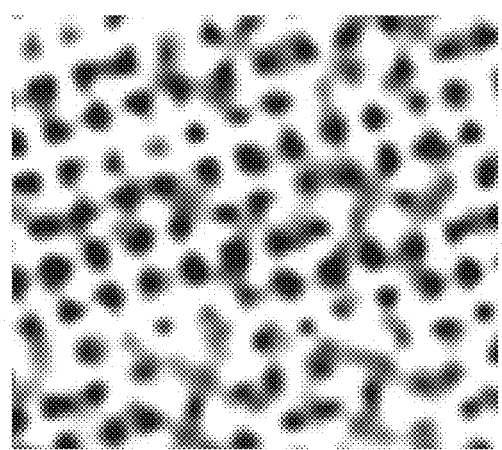
FIG. 17 is an enlarged, fragmentary portion of the colored iris region of FIG. 16.

FIGS. 16 and 17 show another example of an iris region or layer useful in forming an iris region for a contact lens using essentially the same techniques. Enlarged FIG. 17 shows a blow up of a portion of the iris region. This shows how two patterns have been overlaid onto each other to form the design of FIG. 16. It will be understood in all cases, and in particular with respect to the iris region of FIGS. 16 and 17 that additional steps may be performed to produce a design that is aesthetically pleasing and best mimics the natural human iris. In particular the iris region as finally compiled has feathering of different colors in different layers of the iris region that closely imitate the iris of the natural eye. The techniques employed particularly facilitate the interleaving of the various colors.

In one embodiment, the pattern(s) of the iris region 24 are designed using computer software. In particular, the pattern (s) are digital graphic image stored on a conventional computer (not shown). The digital graphic image may be generated on any conventional computer preferably using commercially available software, such as Adobe Illustrator, commercially available from Adobe Systems Incorporated of Palo Alto, Calif., or Paint Shop Pro., commercially available from JASC Software, Inc. of Eden Prairie, Minn.

In one exemplary process, the three illustrated patterns 30, 32, 34 are separately designed using computer software. Each of the patterns 30, 32, 34 has an initial design, such as those depicted in FIG. 8 that is stored on a conventional computer as a digital graphic image. Each initial design can be derived from any digital or analog source including but not limited to existing cosmetic lens products, manufacturer designs and the like. For each initial design, the corresponding graphic image is run through a series of filters (broadly, algorithms) using computer software, such as Adobe Illustrator or Paint Shop Pro. First, a gradient fill filter (broadly, a gradient fill algorithm) is applied to the iris simulating pattern 30. In particular, the gradient fill filter will produce an effect wherein a graphic image 30' will graduate from darker to lighter or vice versa. Preferably the image should be darkest at its middle area and gradually lighten on all sides of the image to where it is lightest at its edge margins. Next, a radial blur filter (broadly, a radial blur algorithm) may be applied to produce a radially oriented feathered effect 32'. The prepared image is then passed through a halftoning filter (broadly, a halftoning algorithm) to arrive at a final image 34'. Optionally, a halftone filter can be applied after application of the gradient fill filter and before the radial blur filter.

Each illustrated pattern is generally an amplitude modulated halftoned image. In each pattern, the color elements are arranged within an imaginary grid having rows and columns. There is a plurality of the rows and a plurality of the columns comprised of color elements varying in size and proximity to one another organized into a series of undulating cycles. An undulating cycle is where the color elements are organized in a manner that the color elements gradually increase or step up in size to a point where the color elements begin to gradually step down or decrease in size along the lengths of the respective rows and columns. Undulating cycles may occur several times along the length of the respective rows and columns and in most all occurrences at the respective rows and columns terminations, the color elements gradually taper down in size. Put another way, in general the size of the color elements gradually increase along the lengths of the respective rows and columns, then gradually decrease. This gradual increase and gradual decrease repeats several times along the length of the respective rows and columns.

FIG. 6D highlights a row R of the illustrated third layer 34. As can be seen, the change in size of the color elements 26C fluctuates a total of about 12 times between a gradual increase (positive) and gradual decrease (negative) along the length of the row R (i.e., gradual increase to gradual decrease to gradual increase to gradual decrease, etc.). Each segment of color elements of increasing size and each segment of color elements of decreasing size is counted as a "fluctuation." In one embodiment, at least about 25% of the rows and at least 25% of the columns have a change in the size of the color elements that fluctuates at least two times between gradually increasing and gradually decreasing (i.e., fluctuates from gradually increasing to gradually decreasing to gradually increasing or from gradually decreasing to gradually increasing to gradually decreasing). Preferably, at least about 40% of the rows and at least about 40% of the columns, and more preferably, at least about 50% of the rows and at least 50% of the columns, have a change in the size of the color elements that fluctuates two or more times, more preferably three or more times, and more preferably still, four or more times, between a gradual increase and gradual decrease along the length of the respective row and column. As illustrated in FIG. 6D, all of the rows and columns include multiple fluctuations.

In one example, each of the graphic images of the patterns 30', 32', 34' (see, FIG. 8) may be sequentially printed on the substrate 28 of the contact lens 20 via an inkjet printing process, such as that described in U.S. Pat. No. 6,767,097, filed Mar. 29, 2001, entitled Colored Contact Lens and Method of Making Same, and incorporated herein by reference. In such an embodiment, each color element 26A-C may be formed by color halftoning so that the element has the appearance of a solid color. Thus, each color element 26A-C may comprise a plurality of cyan, magenta, yellow and/or black (CMYK) dots or rosettes of varying density. If an inkjet process is used, it is more likely that the entire pattern gets printed in one pass. The base pattern 30' is printed on the substrate 28 before any other pattern. After printing the base pattern 30', the second pattern 32' is printed on the substrate 28. Because the second pattern 32' is applied after the base pattern 30', at least some of the second color elements 26B may be printed on top of the first color elements 26A. Next, the third pattern 34' of third color elements 26C arranged in the third desired pattern is printed on the substrate 28. Because the third pattern 34' is applied after the first and second patterns 30', 32', at least some of the third color elements 26C may be printed on the first and/or the second color elements 26A-B. After printing the desired amount of patterns, a cover (not shown), which may be made of a polymeric material, is attached to the lens substrate 28 over the color layers 30', 32', 34' so that the ink is trapped between the substrate and the cover.

It is understood that the color patterns 26 may be formed on the contact lens 20 in other ways. For example, in another embodiment, the color elements 26 may be printed on the contact lens 20 using pad printing which is well established and well known in the art. For example, a suitable technique for applying the discrete colored element 26 to the contact lens 20 is disclosed in U.S. patent application Ser. No. 11/312, 109, filed Dec. 20, 2005 and published as U.S. Publication No. 2006/0158610, the entirety of which is herein incorporated by reference. Other ways of printing or otherwise applying the discrete colored elements 26 on the contact lens 20 is within the scope of the present invention.

It is understood that the layers may be printed or otherwise formed simultaneously without departing from the scope of the present invention. It is also understood that only one single layer may be printed on the lens without departing from the scope of the present invention.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A computer-implemented method of designing an iris region of a colored contact lens, the method comprising:
   providing an annular digital image having a mid-range and outer and inner edge margins to a computer, the annular digital image including color elements representing at least a portion of an iris region of the eye;
   applying, by the computer, a gradient fill algorithm to the digital image such that the color elements gradually decrease in size and increase in distance between constituent color elements as they progress radially from the mid-range toward the outer and inner edge margins; and
   applying, by the computer, a halftoning algorithm to the digital image.

2. A computer-implemented method as set forth in claim 1 further comprising applying, by the computer, a radial blur algorithm to the digital image.

3. A computer-implemented method as set forth in claim 1 further comprising applying, by the computer, radial star cuts to the digital image after applying the gradient fill algorithm.

4. A computer-implemented method as set forth in claim 1 further comprising applying, by the computer, a feathering application to concentrated areas of the digital image to remove sharp distinctions in the digital image.

5. A computer-implemented method as set forth in claim 1 wherein the step of applying the halftoning algorithm is performed after the step of applying the gradient fill algorithm.

6. A computer-implemented method as set forth in claim 1 wherein the digital image comprises a first digital image, the method further comprising overlaying, using the computer, a second annular digital image over the first digital image, the second annular digital image comprising second color elements arranged in a plurality of clusters along the second annular digital image.

7. A computer-implemented method as set forth in claim 6 further comprising overlaying, using the computer, a third annular digital image over the first and second annular digital images, the third annular digital image comprising third color elements arranged in a plurality of clusters along the third annular digital image, the third color elements being arranged differently than the second color elements.

\* \* \* \* \*